3,460,882
WIDE-ANGLE SINGLE PICTURE SYSTEM FOR VISION IN DEPTH
Ardell J. Abrahamson, 916 Almonte Ave.,
Grand Forks, N. Dak. 58201
Filed Oct. 23, 1965, Ser. No. 503,818
Int. Cl. G02b 27/22
U.S. Cl. 350—144                           1 Claim

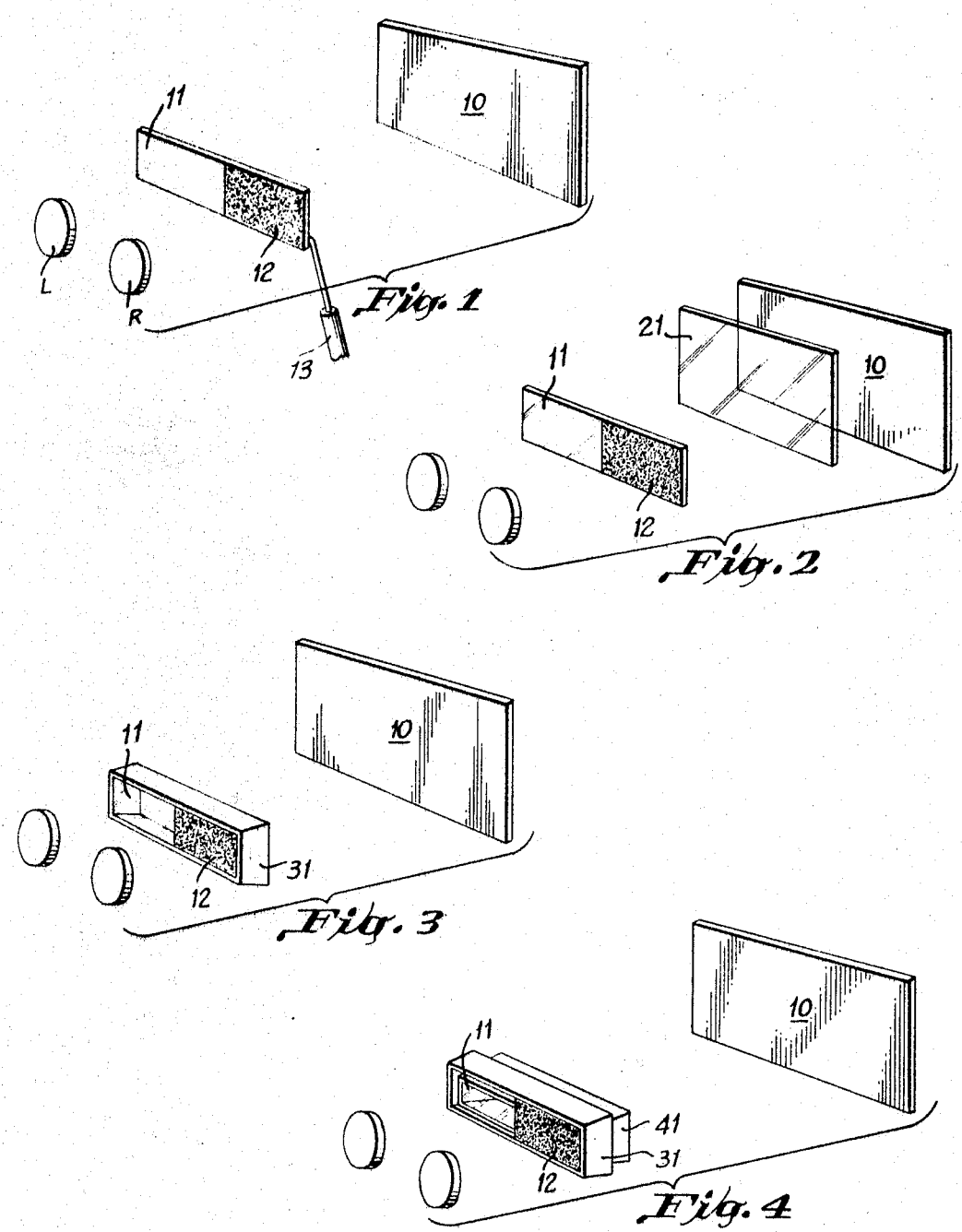

ABSTRACT OF THE DISCLOSURE

A single picture pseudo-stereoscopic device comprising dual visible framing remote from said picture and closely adjacent the observer whereby said framing causes different intensity of light from said picture to reach the eyes of the observer.

---

My invention relates in general to single picture stereoscopic methods and devices, and more particularly to a method and means featuring illocal framing in combination with light-occulsion.

The present invention is directed toward the solution of problems which have long persisted in the field of stereoscopy. One of these problems has been the relative complexity and the greater cost of making stereoscopic image-pairs; and a second and possibly greater problem has been the exhibition or viewing of the image-pairs once they have been obtained.

A closely related difficulty in stereoscopy has been that its image-pair requirements have always kept it out of the main stream of pictorial productivity. The best motion pictures, for example, with the best performers and stories have been unavailable in stereoscopic form. There never has been a great body of pictorial material available in image-pairs. And what there was, has never been compatible in practice with two-dimensional pictures.

There also has been a lack of a convenient wide-angle device to conduct training in depth perception directly from single two-dimensional sources, such as in the analysis and study of the spacial implications of two-dimensional works of pictorial art.

It is therefore an object of my invention to provide for a simplified stereoscopic system that avoids the additional cost, weight, complexity, and greater unreliability in the production, editing, and exhibition of image-pair systems.

A similar object is to retain the capabilities and advantages of ordinary photography or cinematography, while at the same time to enjoy the depth effects.

Another object is to avoid the greater difficulty and cost of achieving motion picture special effects in image-pair stereoscopic terms.

Still another object is to provide for solid relief effects on a very wide screen.

Yet another object is the provision of bright, sharp, clear field depth effects at ordinary television and motion picture screen illumination levels and with standard screen clarity and resolution.

A further object is to provide for completely compatible viewing-in-depth or viewing-in-two-dimensions, at the immediate option of the observer.

A still further object is the provision of stereoscopic television using the standard broadcast bandwidth, and with no change in equipment.

Another object is the provision of good depth quality in the viewing of photographs and other pictorial representations of historical or personal value that were formerly regarded as being unchangeably flat and of which suitable image-pairs can never be obtained.

A related object is to provide increased possiblities for museum displays, and also for advertising displays in depth.

A further object is to provide an improved means for the training of vision in depth as it applies to art and painting, psychology, and other fields of knowledge or utility.

Other objects and a fuller understanding of the invention may be had by referring to the following description and claims, taken in conjunction with the accompanying drawings in which:

FIGURE 1 is a diagrammatic perspective view of the first modification,

FIGURE 2 is a view like FIG. 1, but showing the second modification,

FIGURE 3 is a view like FIG. 1, but showing the third modification,

FIGURE 4 is a view like FIG. 1, but showing the fourth modification.

That a certain depth effect could be obtained from a single picture has long been known, but not widely known. At about the time Columbus first set foot in our part of the world, Leonardo da Vinci wrote in Trattato della Pittura about this visual peculiarity. In the application of geometry to perspective in painting for instance a single point of view (station point) is always assumed, and in examining the result if the observer places a single eye as nearly as possible at the same station point at the correct distance this single picture depth effect is seen. The other eye is closed.

Nevertheless since this monocular depth effect was not very pronounced, and since it has been difficult to account for in the traditional stereoscopic terms of image-pairs, binocular parallax, and so on, it has not attracted very much serious interest over the years. Reference is customarily made to it with derisive quotation marks. However, as will be disclosed, this single picture depth effect can be sufficiently increased in a new way to give a final result often as good as the binocular viewing of natural objects in everyday life, especially for near and medium distance pictures where the depth effect may even be exaggerated. Also the requirement to be at the perspective "station point" is completely dispensed with when using this invention. An observer could for example be situated almost anywhere in an auditorium. And both eyes can be used.

A broad visualization of the present invention reveals that it comprises two main features or subcombinations acting in co-operative combination.

FIRST MAIN FEATURE

This invention has as a first main feature new embodiments of illocal framing: that is, visible framing that is situated in a plane substantially removed from that of the observed picture itself and near the observer. In contrast standard framing as we know is local to the the picture it encloses, or in direct contact with it.

Simply to help explain what illocal framing means reference is now made to an easy experiment with an image-pair system.

If a person looks at an old stereoscopic picture card of image-pairs through a common Holmes type open viewer holding the lens hood or shade right up to the head, the observer does not get the full, natural depth effect. Instead the so called "paper effect" or degraded depth effect is seen. The objects also look miniature sized.

With the cabinet-type or enclosed viewer using a transparency image-pair slide the view is seen as at the end of a short dark tunnel, in full life size and in full natural distance (whatever the actual size of the stereo photographs).

But even with the open Holmes-type viewer a much improved depth effect can be had by holding the stereoscope lens hood 3 to 4 inches away from the head, so that a pictorial area only is framed by the lens board enclosing the two lenses (which are usually rectangular). This framing appears situated somewhere between the picture and the observer and has the capability of improving the depth effect, as a test will show. This is illocal framing. The objects in the picture will appear to be more life-size. The over-all characteristics are then very much like those of the completely enclosed viewer, which is considered to give the ultimate in stereo effects.

The theory has been expounded that the poor effects were simply due to extraneous objects and the mounting which were seen around the edges of the stereo picture. Herbert C. McKay, a noted stereo expert, concludes an article on "Free Viewing in Stereoscopy" in American Photography July 1947, p. 41, by saying: "So it is obviously essential that every bit of the surroundings be eliminated and that the viewer must really constitute a 'window.' Then, when the view is seen as it should be seen and when nothing else whatsoever is visible, there is no unconscious mental conflict. Then and then only is the stereogram seen as it should be, as a recreation of the original in every significant detail. This isolation of the stereogram is impossible with any free-viewing, so the freely viewed stereogram must remain one in which we seem to be looking at a miniature model. The impressiveness of the full size stereo is missing"—so far McKay. This could be called the "minus-surround" theory.

The approach of the present invention on the other hand could be termed a "plus-surroundings" system in that the surroundings of the picture are not occluded by the new forms of illocal framing utilized by this invention. This system is very close to free viewing in that a barely discernible framing element appears to hover in space between the observer and the picture. Also of course a single picture is used rather than image-pairs.

Referring now to the diagrammatic views we note that the subject of observation, 10 FIGURE 1, is just covered or framed as seen from the viewpoint of the left eye by a framing element, 11 FIGURE 1, that is substantially of the same shape as the subject of observation. Thus the surrounding area is not obscured in this form of illocal framing.

SECOND MAIN FEATURE

By interposing a second illocally framing material, 12 FIGURE 1, to entirely cover the picture or subject of observation from the viewpoint of the other eye, which material brings the picture's light-intensity level into the region of extinction, a very fine depth effect can be attained from a single picture, when by means of binocular overlap and fusion the two illocally framed areas are registered one upon the other. This material is usually opaque but it leaves the surroundings open to view. The picture is then life size and the system gives no visual fatigue. A support, 13 FIGURE 1, may be used to hold the framing.

FIGURE 2 illustrates a second embodiment which may be used cooperatively with the other embodiments. A plurality of illocal framing elements is disposed out along the line of sight. The section, 21 FIGURE 2, is of course larger because it is nearer to the picture, 10 FIGURE 2.

In FIGURE 3 a third cooperative form of illocal framing is shown. Here a visible enclosing frame extended laterally along the line of sight, 31 FIGURE 3, is designed for framing fields of the two eyes together, and amplifies the depth effect.

FIGURE 4 illustrates a fourth cooperative modification. An extended enclosing frame, 41 FIGURE 4, is enclosed by or nested in the enclosing frame, 31 FIGURE 4.

PRACTICAL OPERATING INSTRUCTIONS FOR THE INVENTION (1) The shape of the illocal framing should be substantially that of the picture in view. But with some loss of effect, one may partially differ from the other; in such a case, correlation of the top edges and bottom edges is best, if this is possible.

(2) The picture area under observation should just fill the illocally framing enclosure. Usually this leaves the remaining surrounding non-pictorial part of the field of each eye unaffected by the means of this feature of the invention. Under extremely wide-angle conditions such as for example the Cinerama full hemisphere system of course only a portion of the picture can be viewed at a given moment and the surroundings are pictorial but they blend with the enclosed picture area, which is a considerable advantage.

(3) There is no critical inter-ocular distance to be concerned with in the present system, and the framing sections need not necessarily be connected together. One section may be in a different plane than the other, in which case it would of course be of a different size (a size proportionate to its position) see FIGURE 2.

(4) The use of some type of support, 13 FIGURE 1, that will permit a change of position of the framing, such as a flexible gooseneck for example, is suggested.

(5) For the extended enclosure of FIGURES 3 and 4 the material and the dimensions of the material used are not critical as long as they are visible under the circumstances of their use. Therefore the color or shade of brightness is probably more important.

(6) For the extended enclosure, generally the longer the physical extension of the framing along the line of sight the better is the effect.

(7) For the extended enclosure, partial framing that allows of gaps in its outline also may be used, but with a diminished effect.

(8) The extended enclosure may be designed, by altering dimensions, for use with one eye, or for two eyes together behind a single enclosure, or for a double single eye enclosure.

(9) If the picture under observation has a transparency-like quality such as with television and the motion picture screen it gives a superior depth effect compared with printed or painted pictures. A photo made with a longer lens has a superior depth effect.

(10) The open or positive framing element should be placed before the dominant eye or the eye with the better vision, if there is a difference in vision. The negative or occluding framing element goes before the weaker eye.

It will be understood that certain features and subcombinations of this invention are of utility and may be employed without reference to other features and subcombinations. This is contemplated by and is within the scope of my claims.

Although the invention has been described in its preferred forms with a certain degree of particularity, it is understood that the present disclosure of the preferred forms has been made by way of example and that changes in details of construction and the combination and arrangement of parts may be restored to without departing from the spirit and the scope of the invention as hereinafter claimed.

What I claim is:

1. A stereoscopic viewing device comprising a picture and supporting means therefor an aligned frame spaced therefrom and having an opening substantially of the same relative size and configuration as said picture viewed from the observer's standpoint; an aligned mask section of substantially the same relative size and configuration as said picture and frame opening spaced therefrom and toward the observer wherein said section is of such density as to darken the light therethrough and means to adjustably support said frame and mask in relation to each other and said picture.

References Cited

UNITED STATES PATENTS

| | | | |
|---|---|---|---|
| 1,636,450 | 7/1927 | Ames | 350—144 |
| 2,647,336 | 8/1953 | Montebello | 350—144 X |
| 2,885,927 | 5/1959 | Riker | 350—144 X |
| 2,891,440 | 6/1959 | Barake | 350—144 X |
| 2,974,562 | 3/1961 | Rosenbloom | 350—131 X |

FOREIGN PATENTS

| | | |
|---|---|---|
| 208,797 | 12/1923 | Great Britain. |
| 486,199 | 5/1938 | Great Britain. |
| 696,821 | 1/1931 | France. |

OTHER REFERENCES

Gordon, David: "Experimenting with Third Dimensional Motion Pictures," "American Cinematographer," December 1936, pp. 507–514.

DAVID SCHONBERG, Primary Examiner

P. R. GILLIAM, Assistant Examiner

U.S. Cl. X.R.

352—86